(12) United States Patent
Guim Bernat et al.

(10) Patent No.: US 11,468,329 B2
(45) Date of Patent: *Oct. 11, 2022

(54) TECHNIQUES TO MANAGE TRAINING OR TRAINED MODELS FOR DEEP LEARNING APPLICATIONS

(71) Applicant: Intel Corporation, Santa Clara, CA (US)

(72) Inventors: Francesc Guim Bernat, Barcelona (ES); Suraj Prabhakaran, Aachen (DE); Kshitij A. Doshi, Tempe, AZ (US); Da-Ming Chiang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/025,643

(22) Filed: Sep. 18, 2020

(65) Prior Publication Data

US 2021/0004685 A1 Jan. 7, 2021

Related U.S. Application Data

(63) Continuation of application No. 15/859,472, filed on Dec. 30, 2017.

(51) Int. Cl.
*G06N 3/08* (2006.01)
*G06N 5/04* (2006.01)
*G06N 3/063* (2006.01)

(52) U.S. Cl.
CPC .............. *G06N 3/08* (2013.01); *G06N 3/063* (2013.01); *G06N 5/04* (2013.01)

(58) Field of Classification Search
None
See application file for complete search history.

(56) References Cited

U.S. PATENT DOCUMENTS

| | | |
|---|---|---|
| 2006/0031447 A1 | 2/2006 | Holt et al. |
| 2009/0106178 A1 | 4/2009 | Chu |
| 2017/0213154 A1 | 7/2017 | Hammond et al. |
| 2018/0018586 A1 | 1/2018 | Kobayashi et al. |
| 2019/0069437 A1 | 2/2019 | Adrian et al. |

OTHER PUBLICATIONS

Wu, Programming Models' Support for Heterogeneous Architecture, Doctoral Thesis, University of Tennessee, 2017 (Year: 2017).*
Saliou, et al., Analysis of Firewall Performance Variation to Identify the Limits of Automated Network Reconfigurations, ECIW2006, 2006, pp. 1-11 (Year: 2006).*

(Continued)

*Primary Examiner* — Wilbert L Starks
(74) *Attorney, Agent, or Firm* — Essential Patents Group, LLP.; Christopher K. Gagne

(57) ABSTRACT

Examples include techniques to manage training or trained models for deep learning applications. Examples include routing commands to configure a training model to be implemented by a training module or configure a trained model to be implemented by an inference module. The commands routed via out-of-band (OOB) link while training data for the training models or input data for the trained models are routed via inband links.

37 Claims, 10 Drawing Sheets

(56) References Cited

OTHER PUBLICATIONS

Cutress, Ian, "NVIDIA's DGX-2: Sixteen Tesla V100s, 30 TB of NVMe, only $400K", Anandtech, Mar. 27, 2018, retrieved online via https://www.anandtech.com/show/12587/nvidias-dgx2-sixteen-v100-gpus-30-tb-of-nvme-only-400k, 4 pages.
NVIDIA, "NVIDIA A100 Tensor Core GPU Architecuture Unprecedented Acceleration at Every Scale", NVIDIA Corporation, white paper, 2020, 83 pages.
NVIDIA, "NVIDIA DGX A100 the Universal System for AI Infrastructure", NVIDIA Corporation, NVIDIA DGX A100, Data Sheet, May, 2020, 2 pages.
NVIDIA, "NVIDIA DGX-1 Wth Tesla V100 System Architecture The Fastest Platform for Deep Learning", www.nvidia.com; White Paper; WP-08437-002_v01, 2017, 40 pages.
Oh, Nate, "NVIDIA Ships First Volta-based DGX Systems", ANANDTECH, Sep. 7, 2017; retrieved online via https://www.anandtech.com/show/11824/nvidia-ships-first-volta-dgx-systems, 3 pages.
Smith, R. et al., "NVIDIA Unveils the DGX-1 HPC Server: 8 Teslas, 3U, Q2 2016", Anandtech, Apr. 6, 2016. Retrieved online via https://www.anandtech.com/show/10229/nvidia-announces-dgx1-server, 7 pages.
Office Action for U.S. Appl. No. 15/859,472, dated Jun. 2, 2021.
Gomperts, et al., "Development and implementation of parameterized FPGA-based general purpose neural networks for online applications", IEEE Transactions on Industrial Informatics 7.1: 78-89 (year: 2010).
Intel Corp., "Accelerate Your Data Center with Intel FPGAs", Solution Brief, Cloud Service Providers, Intel FPGAs; Case Study; 3 pages.
Intel Corp., "Intel FPGA Programmable Accelaration Card (Intel", Platform Selector Guide, 1 page.
Intel Corp., "Intel FPGA Programmable Acceleration Card (PAC) D5005", Product Brief; 1 page.
Intel Corp., "Intel FPGA Programmable Acceleration CArd D5005", Retrieved online via https://www.intel.com/content/www/us/en/programmable/products/boards_and_kits/dev-kits/altera/intel-fpga-pac-d5005/overview.html; 2 pages.
Intel Corp., "Intel OpenVINO with FPGA Support Through the Intel FPGA Deep Learning Acceleration Suite", Intel FPGA Deep Learning Acceleration Suite enables Intel FPGAs for accelarated AI optimized for performance, power and cost; Solution Brief.
Intel Corp., "Intel Programmable Accelaration Card (Intel PAC) with Intel Arria 10 GX FPGAs", Product Brief; 1 page.
Intel Corp., "Intel Xeon Scalable Platform", The Future-Forward Platform Foundation for Agile Digital Services; Product Brief; Intel Corporation; 2017, 14 pages.
Microway, "Detailed Specifications of the "Skylake-SP" Intel Xeon Processor Scalable Family CPUs", retrieved online via https://www.microway.com/knowledge-center-articles/detailed-specifications-of-the-skylake-sp-intel-xeon-processor-scalable-family-cpus; 24 pages.
Nvidia, "Nvidia DGX-1 Deep Learning System", DGX-1 Data Sheet Apr. 2016.
Final Office Action for U.S. Appl. No. 15/859,472, dated Aug. 16, 2021.
Notice of Allowance for U.S. Appl. No. 17/208,861, dated Jun. 23, 2021.
Corrected Notice of Allowability for U.S. Appl. No. 17/208,861, dated Sep. 9, 2021.
Calcm, "Xeon+FPGA Platform for the Data Center; CARL 2015 Speaker: Prabhat K. (PK) Gupta, Intel", The Fourth Workshop in the Intersections of Computer Architecture and Reconfigurable Logic (CARL 2015).
Chappell, N., "AI—Rapidly CHangig How We, Live, Work, and Play", Intel IT Peer Network; Nov. 15, 2016.
Davidson, A., "A New FPGA Architecture and Leading-Edge FinFET Process Technology Promise to Meet Next-Generation System Requirements", Altera Corporation, WP-01220-1.1, White Paper, Jun. 2015.
Fulton III, S., "Intel Sets FPGA Goal: Two Orders of Magnitude Faster than GPGPU by 2020", Data Center Knowledge; https://www.datacenterknowledge.com/archives/2016/11/17/intel-sets-fpga-goal-2-orders-magnitude-faster-gpgpu-2020; Nov. 17, 2016.
Gupta, PK, "Xeon+FPGA Platform for the Data Center", Intel ISCA/CARL 2015.
Kennedy, P., "Intel Demonstrating Broadwell-EP with FPGA On-package at SC16", STH; AI News; Nov. 15, 2016.
McNamara, D., "Intel's Stratix 10 FGPA: Supporting the Smart and Connected Revolution", Intel Newsroom; Editorial; Oct. 4, 2016.
Office Action for U.S. Appl. No. 15/859,472, dated Dec. 17, 2021.

* cited by examiner

Storage Medium 600

Computer Executable Instructions for 500

RECEIVE MANAGEMENT DATA TO CONFIGURE A TRAINED MODEL TO BE IMPLEMENTED BY AN INFERENCE MODULE FOR A DEEP LEARNING APPLICATION
802

IDENTIFY THE INFERENCE MODULE TO IMPLEMENT THE TRAINED MODEL
804

CAUSE THE TRAINED MODEL TO BE CONFIGURED RESPONSIVE TO THE MANAGEMENT DATA BASED ON ONE OR MORE COMMANDS ROUTED TO THE INFERENCE MODULE VIA AN OOB LINK, THE TRAINED MODEL IMPLEMENTED BY THE INFERENCE MODULE USING INPUT DATA RECEIVED VIA AN INBAND LINK
806

*FIG. 8*

Storage Medium 900

Computer Executable Instructions for 800

*FIG. 9*

TECHNIQUES TO MANAGE TRAINING OR TRAINED MODELS FOR DEEP LEARNING APPLICATIONS

CLAIM FOR PRIORITY

This application is a continuation of and claims priority to co-pending U.S. patent application Ser. No. 15/859,472, filed on Dec. 30, 2017 and titled "Techniques to Manage Training or Trained Models for Deep Learning Applications", which is incorporated by reference in its entirety.

TECHNICAL FIELD

Examples described herein are generally related to a platform for artificial intelligence (AI) training appliances or AI inference appliances.

BACKGROUND

Deep learning applications may employ the use of artificial intelligence (AI) or machine learning. The use of AI may include using training resources to build or construct trained models based on processing large amounts of training data. For example, processing millions of images of different faces to build facial recognition models to identify a group of people or even specific individuals. Once a model is constructed or trained, the trained model may be implemented by inferencing resources. These inferencing resources may process data (e.g., various types of images) as data inputs to trained models to arrive at results (e.g., facial recognition).

BRIEF DESCRIPTION OF THE DRAWINGS

FIG. 6 illustrates an example of a first storage medium.
FIG. 8 illustrates an example of a second logic flow.
FIG. 9 illustrates an example of a second storage medium.

DETAILED DESCRIPTION

As deep learning applications become more common and more complex, a need for deep learning infrastructure having integrated AI capabilities for training and inferencing resources is growing for entities deploying or using these deep learning applications. These integrated AI capabilities may need to be deployed and used readily across a breadth of different scenarios ranging from edge, internet of things (IoT), cloud services for mobile devices or to data centers. Each scenario may have varying levels of sophistication.

Deep learning infrastructure having integrated AI capabilities for training and inferencing resources may need to be transparent, powerful, power-efficient and flexible for entities deploying or using deep learning applications. Just as cloud infrastructure permits easy application of a certain amount of computational and power budget flexibility among different workloads or needs at different times, a similar need for possibly dynamically assigning deep learning infrastructure may apply. This may mean not having to burn power and delay deep learning results generated by training and/or inferencing resources due to under or over-utilized processing resources.

A typical way to field specialized AI hardware for deep learning infrastructure is to have bootable central processing units (CPUs) to act as hosts for training resources and/or inferencing resources (e.g., specialized devices/accelerators). Even some types of training resources such as a graphics processing unit (GPU) may need to be managed from a general-purpose CPU. CPUs acting as hosts for specialized AI hardware or managing a GPU used for training may add additional operating overhead. Also, these types of deep learning infrastructures may become hard to modify or change as power and cost may dictate how resources included in these types of deep learning infrastructures are configured. Power and cost dictating resource configurations may result in a focus more on attaching power efficient CPUs to training and inferencing resources, or over-designing platforms with powerful CPUs for managing deep learning infrastructure that may result in costly and/or inefficient platforms. It is with respect to these challenges that the examples described herein are needed.

Figure 1:
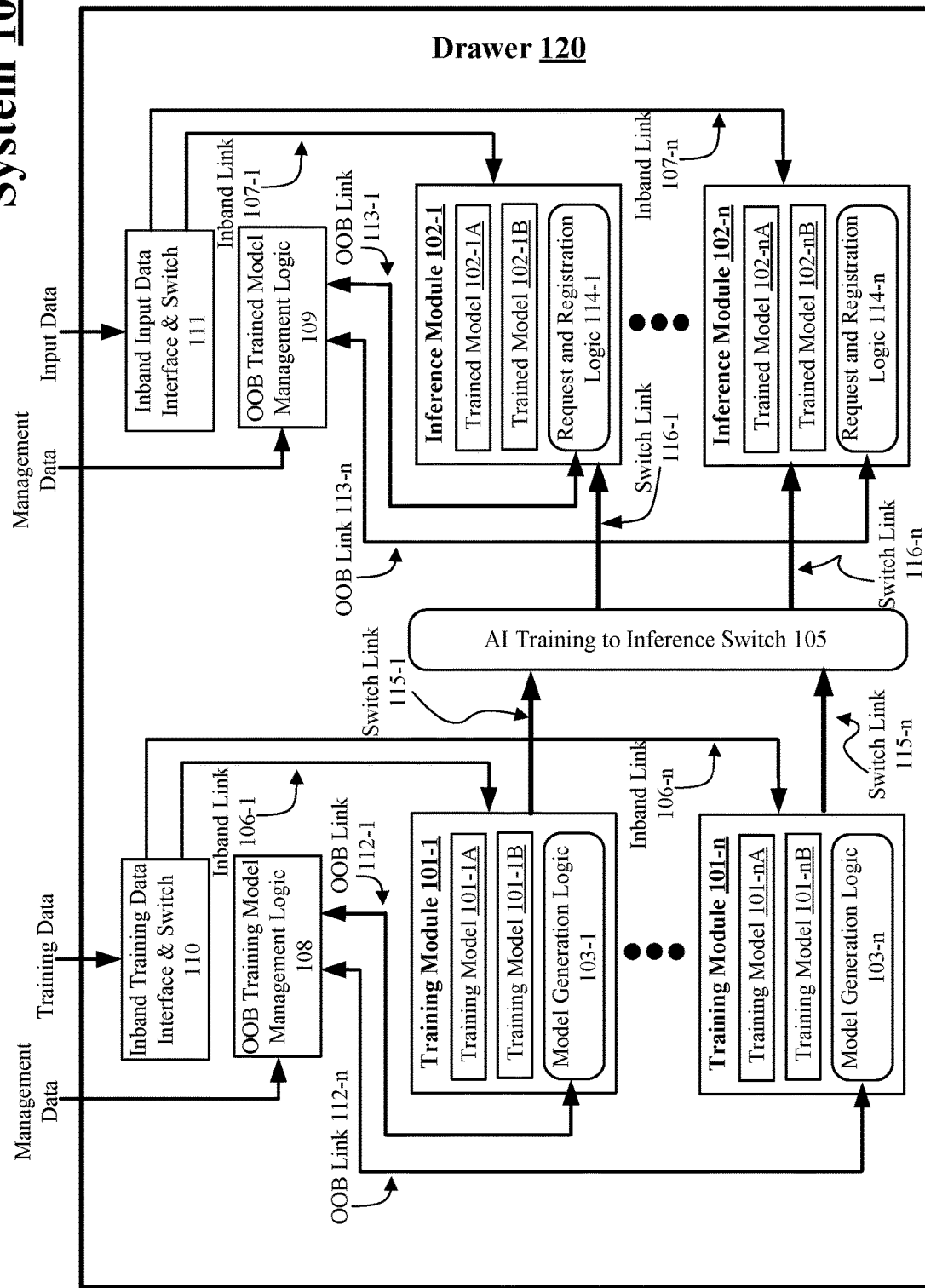
FIG. 1 illustrates an example first system.

FIG. 1 illustrates an example system 100. In some examples, as shown in FIG. 1, system 100 includes a drawer 120 that includes training modules 101-1 to 101-*n* and inference modules 102-2 to 102-*n*, where "n" represents any whole positive integer greater than 1. For these examples, drawer 120 also includes an out-of-band (OOB) training model management logic 108 coupled with training modules 101-1 to 101-*n* via respective OOB links 112-1 to 112-*n* and an OOB trained model management logic 109 coupled with inference modules 102-1 to 102-*n* via respective OOB links 113-1 to 113-*n*. Drawer 120 also includes an inband training data interface and switch 110 coupled with training modules 101-1 to 101-*n* via respective inband links 106-1 to 106-*n* and inband input data interface and switch 111 coupled with inference modules 102-1 to 102-*n* via respective inband links 107-1 to 107-*n*. Also, as shown in FIG. 1, an AI training to inference switch 105 may be coupled with training modules 101-1 to 101-*n* via respective switch links 115-1 to 115-*n* and coupled with inference modules 102-1 to 102-*n* via respective switch links 116-1 to 116-*n*.

According to some examples, drawer 120 may represent a platform comprised of a single circuit board or multiple physically coupled circuit boards that include both training and inferencing resources. Drawer 120 may be inserted as a drawer for a larger computing platform or system with several other drawers that may also include training and inferencing resources (e.g., configured as a rack). The larger computing platform or system may also include other computing resources in separate drawers such as drawers including CPUs or storage resources. Drawer 120 may be configured in a similar manner as a sled or blade inserted in a larger computing platform such as rack.

In some examples, OOB links 112-1 to 112-*n* or OOB links 113-1 to 113-*n* may be configured as sideband communication links that may transmit requests or management data to training modules 101-1 to 101-*n* or inference modules 102-1 to 102-*n* to manage or configure these modules (described more below). For these examples, OOB links 112-1 to 112-*n* or OOB links 113-1 to 113-*n* may operate using communication protocols such as, but not limited to Ethernet communication protocols, such as described in one or more Ethernet standards promulgated by the Institute of Electrical and Electronics Engineers (IEEE). For example, one such Ethernet standard promulgated by IEEE may include IEEE 802.3-2012, Carrier sense Multiple access with Collision Detection (CSMA/CD) Access Method and Physical Layer Specifications, Published in December 2012 (hereinafter "IEEE 802.3 specification"). Also, OOB links 112-1 to 112-$n$ or OOB links 113-1 to 113-$n$ may transmit requests or management data to respective training modules 101-1 to 101-$n$ or inference modules 102-1 to 102-$n$ in communication links that are separate from inband links106-1 to 106-$n$ or 107-1 to 107-$n$ used to transmit training or input data to respective training modules 101-1 to 101-$n$ or inference modules 102-1 to 102-$n$. Also, since training modules 101-1 to 101-$n$ or inference modules 102-1 to 102-$n$ may receive request or management data relatively rarely compared to these modules receiving training or input data, OOB links 112-1 to 112-$n$ or OOB links 113-1 to 113-$n$ may be arranged to support lower data bandwidths compared to inband links106-1 to 106-$n$ or 107-1 to 107-$n$.

According to some examples, inband links 106-1 to 106-$n$ or 107-1 to 107-$n$ may include high speed and/or high bandwidth communication links to route training or input data to training modules 101-1 to 101-$n$ or inference modules 102-1 to 102-$n$. For these examples, inband links 106-1 to 106-$n$ or 107-1 to 107-$n$ may include the use of a high speed serializer and deserializer (SerDes) to enable data bandwidths ranging from several gigabits-per-second to over a terabit-per-second. These relatively high bandwidths, for example, may allow large amounts of training data received by inband training data interface and switch 110 to be routed to destination training modules from among training modules 101-1 to 101-$n$ for use in training models 101-1AB to 101-$n$A/B. The relatively high bandwidths, for example, may also allow large amounts of input data to be received by inband input data interface and switch 111 and routed to destination inference modules from among inference modules 102-1 to 102-$n$ for use in trained models 102-1A/B to 102-$n$A/B.

In some examples, as shown in FIG. 1, training modules 101-1 to 101-$n$ may couple with AI training to inference switch 105 via respective switch links 115-1 to 115-$n$. Also, as shown in FIG. 1, inference modules 102-1 to 102-$n$ may couple with AI training to inference switch 105 via respective switch links 116-1 to 116-$n$. As described more below, switch links 115-1 to 115-$n$ and 116-1 to 116-$n$ may be used to route trained models generated by training modules 101-1 to 101-$n$ to at least one of interference modules 102-1 to 102-$n$. For these examples, AI training to inference switch 105 may be configured as a software or hardware type of switch to route trained models to destination inference modules from among inference modules 102-1 to 102-$n$. According to some examples, training to inference switch 105 may be configured to route trained models to destination inference modules using one or more types of communication protocols, such as, but not limited to, Ethernet, Infiniband, Fibre Channel, or transmission control protocol (TCP). Switch links 115-1 to 115-$n$ and 116-1 to 116-$n$ may also have relatively lower data bandwidths compared to data bandwidths for inband links 106-1 to 106-$n$ or 107-1 to 107-$n$.

According to some examples, OOB training module management logic 108 may include logic and/or features to receive management data and perform OOB management of training modules 101-1 to 101-$n$. For these examples, the management data may be received via a generic interface (not shown) coupled with OOB training module management logic 108. The generic interface may provide a means to receive requests to configure training models being implemented by training modules 101-1 to 101-$n$ or to control/manage various functions of these training modules via commands sent over OOB links 112-1 to 112-$n$. For example, commands such as, but not limited to, starting or stopping implementation of training models, commands to change one or more priorities associated with implementing training models, or commands to set/adjust quality of service (QoS) priorities and service level agreements (SLAs) for training models or training modules (e.g., to specify bandwidths between producers and consumers for these training resources).

In some examples, similar to OOB training module management logic 108, OOB trained model management logic 109 may include logic and/or features to receive management data and perform OOB management of inference modules 102-1 to 102-$n$ and/or trained models implemented by these inference modules. For these examples, the management data may be received via a generic interface (not shown) coupled with OOB trained module management logic 109. The generic interface may provide a means to receive requests to configure inference modules 102-1 to 102-$n$ or to control/manage various functions of these inference modules via commands sent over OOB links 113-1 to 113-$n$. For example, commands such as, but not limited to, starting or stopping implementation of trained models, commands to change one or more priorities associated with implementing trained models, or commands to set/adjust QoS priorities and SLAs for trained models or inference modules.

According to some examples, use of OOB training module management logic 108 and OOB trained model management logic 109 coupled with separate generic interfaces to receive management data and perform OOB management via separate OOB links, may enable managing/configuring training modules 101-1 to 101-$n$ or managing/configuring inference modules 102-1 to 102-$n$ to be handled such that the underlying infrastructure included in drawer 120 may be software-defined, transparent and flexible. Software-defined, transparent and flexible may be desirable traits for a deep learning infrastructure having integrated training and inference capabilities such as shown in FIG. 1 for drawer 120. Also, the separate management logic and OOB links for managing training and inference modules may add robustness and resiliency.

In some examples, as shown in FIG. 1, OOB training module management logic 108 may be coupled with model generation logic 103-1 to 103-$n$ at respective training modules 101-1 to 101-$n$ via OOB links 112-1 to 112-$n$. For these examples, responsive to management/control by OOB training module management logic 108, model generation logic 103-1 to 103-$n$ may be arranged to adapt and optimize trained models generated as a result of implementing training models 101-1A/B or 101-$n$A/B. These trained models may be translated into bit-ware (e.g., executable by a field programmable gate array (FPGA)) by model generation logic 103-1 to 103-$n$ and then forwarded to AI training to interference switch 105 via respective switch links 115-1 to 115-$n$. AI training to interference switch 105 may then forward trained models to one or more destination inference modules of inference modules 102-1 to 102-$n$ for loading or programming of trained models to the one or more destination inference modules.

In some examples, as shown in FIG. 1, OOB trained module management logic 109 may be coupled with request and registration logic 114-1 to 114-$n$ at respective inference modules 102-1 to 102-$n$ via OOB links 113-1 to 113-$n$. For these examples, responsive to management/control by OOB trained module management logic 109, registration logic 114-1 to 114-*n* may been arranged to set up trained models either forwarded to inference modules 102-1 to 102-*n* from AI training to inference switch 105 or uploaded and received from OOB trained module management logic 109. For example, trained model 102-1A at inference module 102-1 may have originated from a trained model generated by training module 101-1 that was translated to bit-ware by model generation logic 103-1 and routed through AI training to inference switch 105 to registration logic 114-1 for set up at inference module 102-1. Meanwhile, trained model 102-1B may have been uploaded by OOB trained module management logic 109 and then sent to registration logic 114-1 for set up at inference module 102-1.

According to some examples, training modules 101-1 to 101-*n* may include processing elements such as application specific integrated circuits (ASICs) or other types of specialized processing elements such as graphics processing units (GPUs) or neural network processors (NNPs). Also, inference modules 102-1 to 102-*n* may include programmable processing elements such as FPGAs. For these examples, model generation logic 103-1 to 103-*n* may be configured by OOB training module management logic 108 for effective and efficient uses of different categories of FPGAs that may be added or removed from inference modules 102-1 to 102-*n*. This may allow drawer 120 to be upgraded with newer or different FPGAs and/or have a changing variety of FPGAs to address a range of possibly changing categories or problems being handled by particular AI operations associated with one or more deep learning applications. For example, deep learning applications such as facial or voice recognition to identify a person or a group of people for security and/or social media purposes.

Figure 2:
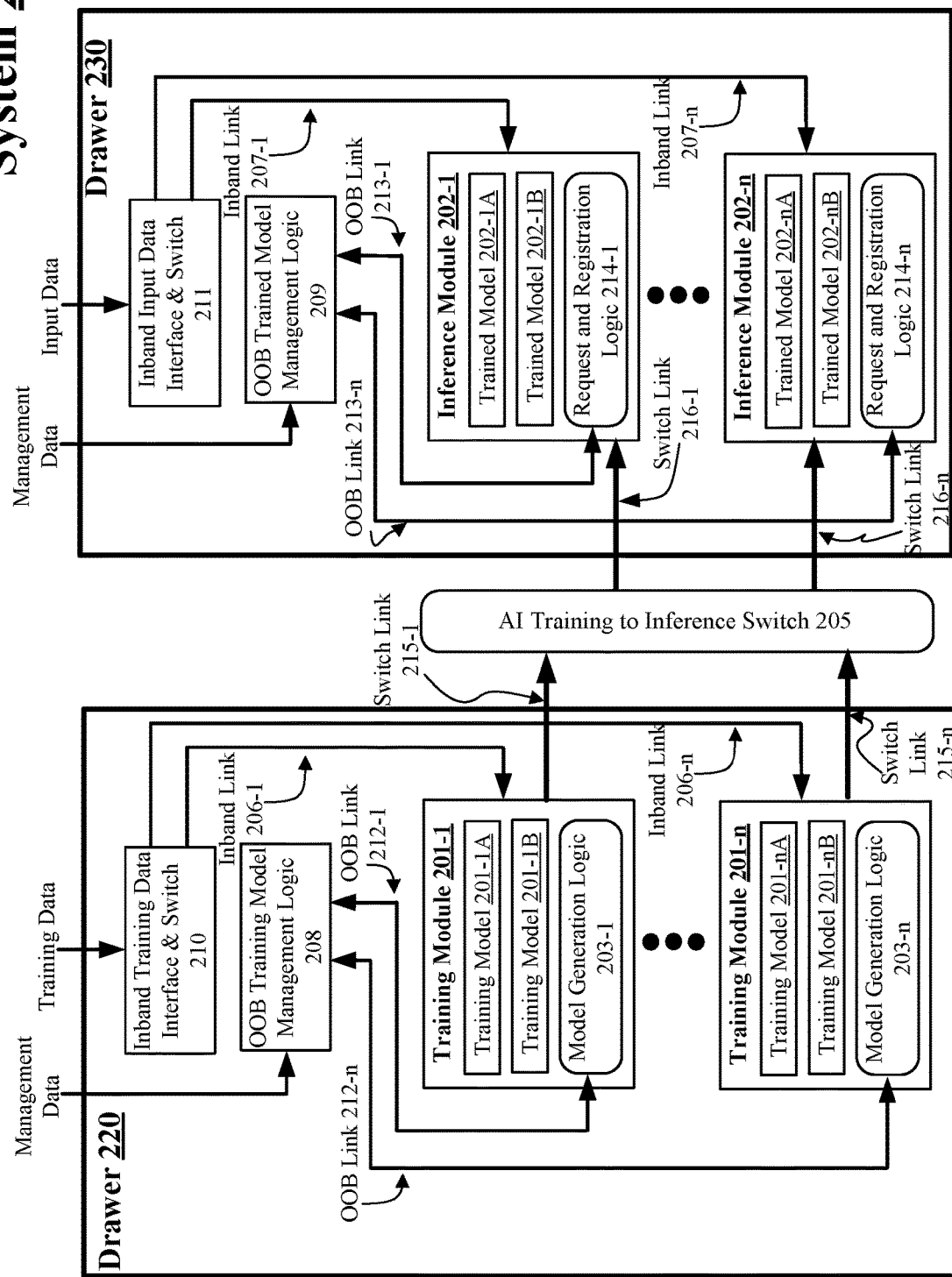
FIG. 2 illustrates example second system.

FIG. 2 illustrates example system 200. In some examples, as shown in FIG. 2, system 200 may include a drawer 220 and a drawer 230 coupled through an AI training to inference switch 205. For these examples, system 200 includes similar elements as shown in FIG. 1 for system 100, but system 200 has training resources and inference resources on separate drawers. Drawers 220 and 230 may be inserted as drawers in a larger computing platform or system. Like drawer 120, drawers 220 and 230 may also be configured as a sled or blade in a larger computing platform such as a rack. Management or control of training modules 201-1 to 201-*n* or of inference modules 202-1 to 202-*n* may be done in a similar or same manner as mentioned previously for training modules 101-1 to 101-*n* or of inference modules 102-1 to 102-*n*.

In some examples, as shown in FIG. 2, AI training inference switch 205 may be physically separate from drawer 220 or 230. For these examples, switch links 215-1 to 215-*n* from drawer 220 and switch links 216-1 to 216-*n* to drawer 230 may be routed through a backplane of a larger computing platform or system that includes drawers 220 and 230.

According to some examples, AI training inference switch 205 may be a part of either drawer 220 or drawer 230. For these other examples, the drawer not including AI training inference switch 205 may have its switch links routed through a backplane of a larger computing platform that includes drawer 220 and drawer 230.

In some examples, AI training inference switch 205 may be located on a drawer, sled or blade that is separate from drawer 220 or drawer 230. For these examples, AI training inference switch 205 may server as a switch for just drawer 220 or drawer 230 or may serve as a switch for multiple drawers for training modules routing trained models to one or more drawers for inference modules. Switch links 215-1 to 215-*n* or switch links 216-1 to 216-*n* may be routed through a backplane of a larger computing platform that includes drawers 220, 230 and the drawer including AI training inference switch 205.

According to some examples, rather than coupling to a single drawer through AI training to inference switch 205 as shown in FIG. 2, drawer 220 may couple to multiple drawers configured similar to drawer 230. For these examples, trained models generated by training modules 201-1 to 201-*n* may be routed through AI training to inference switch 205 to inference modules located on one or more drawers having switch links coupled with AI training to interference switch 205.

Figure 3:
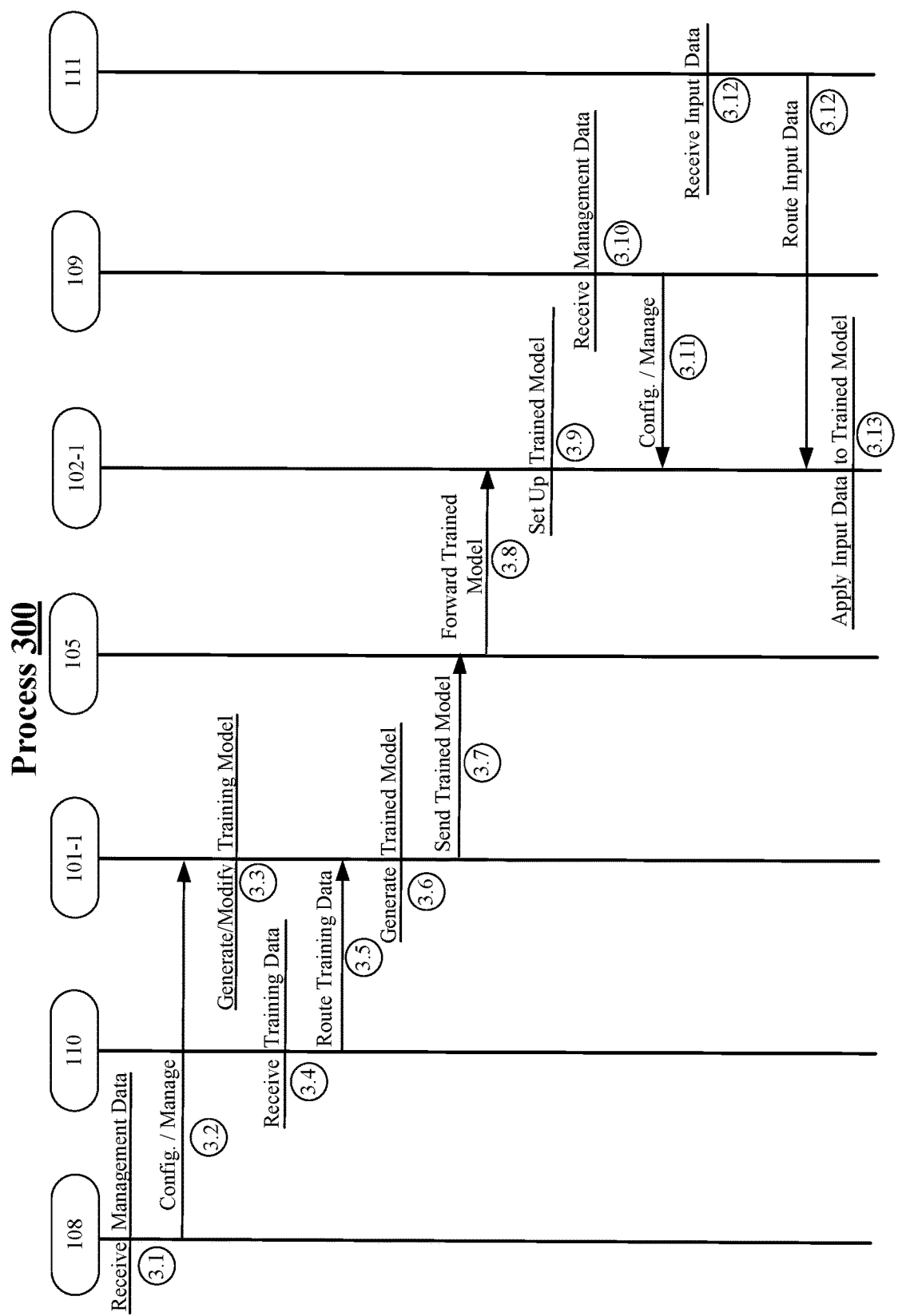
FIG. 3 illustrates an example process.

FIG. 3 illustrates an example process 300. In some examples, process 300 may be an example process of how training and inference modules may be managed or configured to support AI operations. For these examples, elements of system 100 as shown in FIG. 1 may be related to process 300. These elements of system 100 may include, but are not limited to, OOB training model management logic 108, inband training data interface and switch 110, training module 101-1, AI training to inference switch 105, inference module 102-1, OOB trained model management logic 109 or inband input data interface and switch 111.

Beginning at process 3.1 (Receive Management Data), OOB training model management logic 108 may receive management data. In some examples, the management data may include a request to configure or manage a particular training model being implemented by training module 101-1 for a deep learning application. For example, the management data may request to configure or manage a training model such as training model 101-1B that may be used for such deep learning applications as facial, image or voice recognition for individuals or groups of individuals. The management data may also indicate an operation that is to be performed as part of the request. The operation may include, but is not limited to, starting or stopping the training model or reconfiguring one or more parameters of the training model (adding/subtracting inputs or changing one or more training algorithms).

Moving to process 3.2 (Config./Manage), OOB training model management logic 108 may configure or manage the training model indicated in the received management data. For these examples, OOB training model management logic 108 may utilize a training lookup table that indicates what training module is implementing a given training model to determine which training module is implementing the particular training module. For example, the management data may indicate a request to configure or manage training model 101-1B and OOB training model management logic 108 may utilize the training lookup table to match training model 101-1B to training module 101-1. In other examples, the management data may indicate that training model 101-1B is a new training model. For these other examples, OOB training model management logic 108 may determine what training module can implement the new training model and then update the training lookup table based on that determination. This determination may include load-balancing training models to be implemented between one or more of training modules 101-1 to 101-*n* or possibly removing one or more training models if all training modules are at capacity or overloaded. Removing one or more training models implemented at a training module may enable training model 101-B to replace the removed training model at that training module. For these other examples, the update to the training lookup table, for example, may indicate that training model 101-1B is to be implemented by training module 101-1.

According to some examples, OOB training model management logic 108 may configure or manage training model 101-1B implemented by training module 101-1 by issuing one or more training commands. The training commands may be routed via OOB link 112-1 and may include or may be based on the received management data. An example format for training commands routed via OOB link 112-1 may be "ManageTraining(Model_ID, Op)", where Model_ID indicates training model 101-1B and Op indicates the desired operation to be configured or managed. Model_ID may a unique identifier that may have been agreed upon previously. For example, a previously agreed upon universal unique identifier (UUID).

Moving to process 3.3 (Generate/Modify Training Model), training module 101-1 may generate training model 101-1B if new or modify training model 101-B if already being implemented by training module 101-1 for a deep learning application (e.g., facial recognition of a particular individual or individuals) for which training model 101-1B is to be trained. Generating or modifying training model 101-B may be based on the operation indicated in the management data received by OOB training model management logic 108.

Moving to process 3.4 (Receive Training Data), inband training data interface and switch 110 may receive training data to be used in training model 101-1B implemented by training module 101-1 for the deep learning application for which training model 101-1B is to be trained. In some examples, the training data may be in a format of "Train (Model_ID, Data)", where Model_ID identifies training model 101-1B and Data includes the training data to be used in training model 101-1B.

Moving to process 3.5 (Route Training Data), inband training data interface and switch 110 may utilize the training lookup table to determine that training module 101-1 is to implement training model 101-1B for the deep learning application and then route the training data to training module 101-1 based on that determination.

Moving to process 3.6 (Generate Trained Model), model generation logic 103-1 at training module 101-1 may generate a trained model based on received training data processed by training module101-1 while implementing training model 101-1B for the deep learning application. In some examples, the generated trained model may be translated by model generation logic 103-1 to bit-ware and then identified as trained model 102-1B.

Moving to process 3.7 (Send Trained Model), model generation logic 103-1 at training module 101-1 may cause trained model 102-1B to be sent to AI training to inference switch 105. In some examples, trained model 102-1B may be sent via switch link 115-1.

Moving to process 3.8 (Forward Trained Model(s)), AI training to inference switch 105 may forward trained model 102-1B to inference module 102-1. In some examples, request and registration logic 114-1 may receive trained model 102-1B and may send an indication to OOB trained model management logic 109 via OOB link 113-n that trained model 102-1B is ready to be set up at inference module 102-1.

Moving to process 3.9 (Set Up Trained Model), request and registration logic 114-1 may receive an indication from OOB trained model management logic 109 approving at least an initial set up of trained model 102-1B at inference module 102-1. In some examples, approval may be based on load considerations for inference module 102-1. For these examples, OOB trained model management logic 109 may update an inference lookup table that indicates trained model 102-1B is being implemented by inference module 102-1 for the deep learning application.

Moving to process 3.10 (Receive Management Data), OOB trained model management logic 109 may receive management data. According to some examples, the management data may include a request to configure or manage trained model 102-1B for the deep learning application. The management data may also indicate an operation that is to be performed. The operation may include, but is not limited to, starting or stopping trained model 102-1B or reconfiguring one or more parameters of trained model 102-1B.

According to some examples, OOB trained model management logic 109 may configure or manage trained model 102-1B implemented by inference module 102-1 by issuing one or more trained commands. The trained commands may be routed via OOB link 113-1 and may include the received management data. An example format for the trained commands routed via OOB link 113-1 may be "ManageInference(Model_ID, Op)", where Model_ID indicates trained model 102-1B and Op indicates the desired operation.

Moving to process 3.11 (Config./Manage), OOB trained model management logic 109 may configure or manage trained model 102-1B according to the received management data. In some examples, OOB trained model management logic 109 may refer to the inference lookup table to determine that inference module 102-1 is implementing trained model 102-1B for the deep learning application.

Moving to process 3.12 (Receive Input Data), inband input data interface and switch 111 may receive input data to be used in trained model 101-1AB implemented by inference module 102-1. In some examples, the training data may be in a format of "Inference (Model_ID, Payload)", where Model_ID identifies trained model 102-1B and Payload includes the input data to be used in trained model 102-1B.

Moving to process 3.13 (Route Input Data), inband input data interface and switch 111 may utilize the inference lookup table to determine that inference module 102-1 is implementing trained model 102-1B and then route the training data to inference module 102-1 based on that determination.

Moving to process 3.14 (Apply Input Data to Trained Model), the input data may be applied to trained model 102-1A implemented by inference module 102-1 for the deep learning application. In some examples, the applied input data may cause inference module 102-1 to return a result for the deep learning application.

Figure 4:
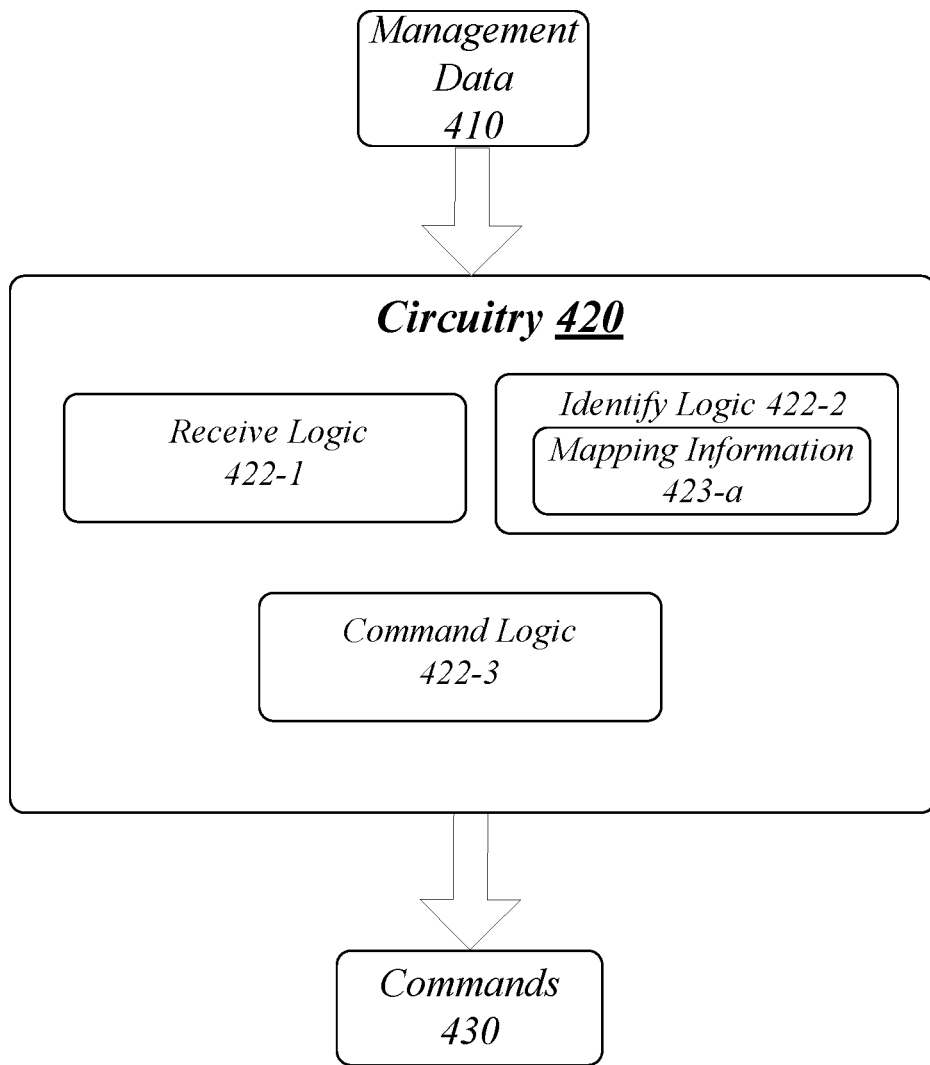
FIG. 4 illustrates an example block diagram for a first apparatus.

FIG. 4 illustrates an example block diagram for apparatus 400. Although apparatus 400 shown in FIG. 4 has a limited number of elements in a certain topology, it may be appreciated that the apparatus 400 may include more or less elements in alternate topologies as desired for a given implementation.

According to some examples, apparatus 400 may be included or embodied as OOB training model management logic 108 or 208 as shown in FIG. 1 or 2 and may be supported by circuitry 420 maintained at OOB training model management logic 108 or 208. Circuitry 420 may include a processor circuit arranged to execute one or more software or firmware implemented modules, components or logic 422-a (module, component or logic may be used interchangeably in this context). In other examples, circuitry 420 may be arranged to implement modules, components or logic 422-a that may be wholly or at least partially implemented in hardware (module, component or logic may also be used interchangeably in this context). It is worthy to note that "a" and "b" and "c" and similar designators as used herein are intended to be variables representing any positive integer. Thus, for example, if an implementation sets a value for a=3, then a complete set of modules, components or logic 422-a may include logic 422-1, 422-2 or 422-3. The examples presented are not limited in this context and the different variables used throughout may represent the same or different integer values. Also, "logic", "module" or "component" may also include software/firmware stored in computer-readable media, and although types of logic are shown in FIG. 4 as discrete boxes, this does not limit these types of logic to storage in distinct computer-readable media (e.g., a separate memory, etc.).

According to some examples, as mentioned above, circuitry 420 may include a processor circuit. Circuitry 420 may be generally arranged to execute or implement one or more components, modules or logic 422-a. In some examples circuitry 420 may be configured as an application specific integrated circuit (ASIC) and at least some components, modules or logic 422-a may be implemented as hardware elements of the ASIC. According to some examples, circuitry 420 may be configured as a field programmable gate array (FPGA) and at least some components, modules or logic 422-a may be implemented as hardware elements of the FPGA.

In some examples, apparatus 400 may include a receive logic 422-1. Receive logic 422-1 may be executed or implemented by circuitry 420 to receive, via a link, management data to configure a training model to be implemented by a training module for a deep learning application. For these examples, the management data may be included in management data 410.

According to some examples, apparatus 400 may also include an identify logic 422-2. Identify logic 422-2 may be executed or implemented by circuitry 420 to identify the training module to implement the training model. For these examples, identify logic 422-2 may maintain mapping information 423-a (e.g., in a lookup table) that may indicate which training models are being implemented by which training module from among a plurality of training modules. Identify logic 422-2 may use mapping information 423-a to identify the training module.

In some examples, apparatus 400 may also include a command logic 422-3. Command logic 422-3 may be executed or implemented by circuitry 420 to cause the training module to be configured responsive to the management data based on one or more commands routed to the training module via an OOB link. For these examples, the training module may receive training data for the training model via an inband link and generate a trained model based on using the training data to implement the training model. The one or more commands may be included in commands 430.

Various logic, modules or components of apparatus 400 may be communicatively coupled to each other by various types of communications media to coordinate operations. The coordination may involve the uni-directional or bi-directional exchange of information. For instance, the logic, modules or components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
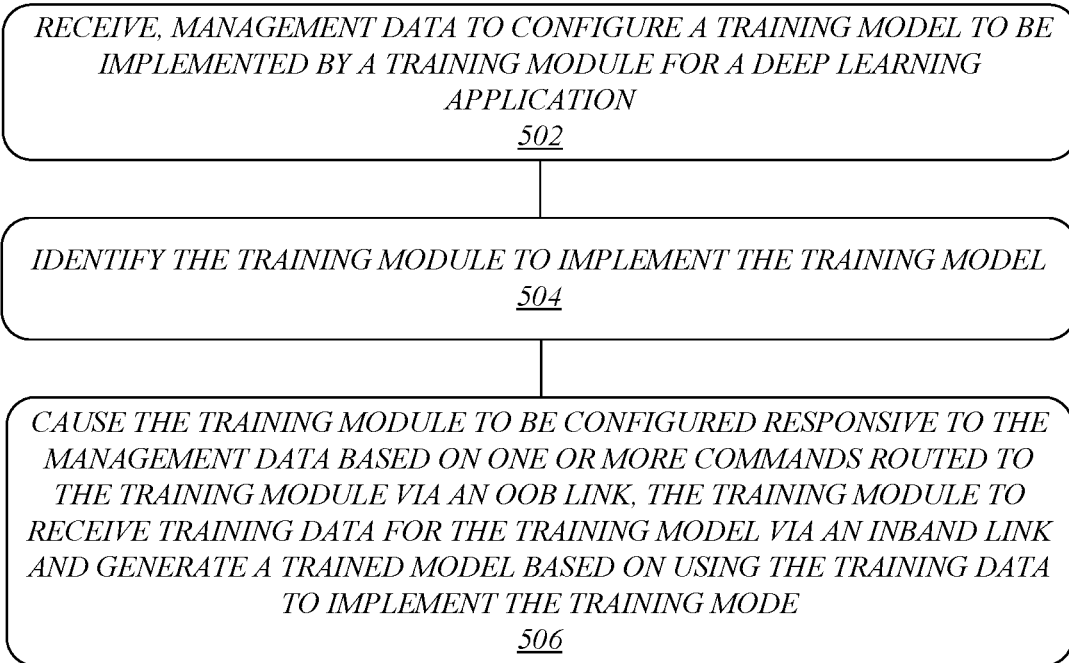
FIG. 5 illustrates an example of a first logic flow.

FIG. 5 illustrates an example logic flow 500. Logic flow 500 may be representative of some or all of the operations executed by one or more logic or devices described herein, such as logic included in apparatus 400. More particularly, logic flow 500 may be implemented by at least receive logic 422-1, identify logic 422-2 or command logic 422-3.

According to some examples, logic flow 500 at block 502 may receive management data to configure a training model to be implemented by a training module for a deep learning application. For these examples, receive logic 422-1 may receive the management data.

In some examples, logic flow 500 at block 504 may identify the training module to implement the training module. For these examples, identify logic 422-2 may identify the training module.

According to some examples, logic flow 500 at block 506 may cause the training module to be configured responsive to the management data based on one or more commands routed to the training module via an OOB link, the training module to receive training data for the training model via an inband link and generate a trained model based on using the training data to implement the training model. For these examples, command logic 422-3 may cause the training module to be configured responsive to the management data based on the one or more commands.

FIG. 6 illustrates an example storage medium 600. As shown in FIG. 6, the first storage medium includes a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writable or re-writable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
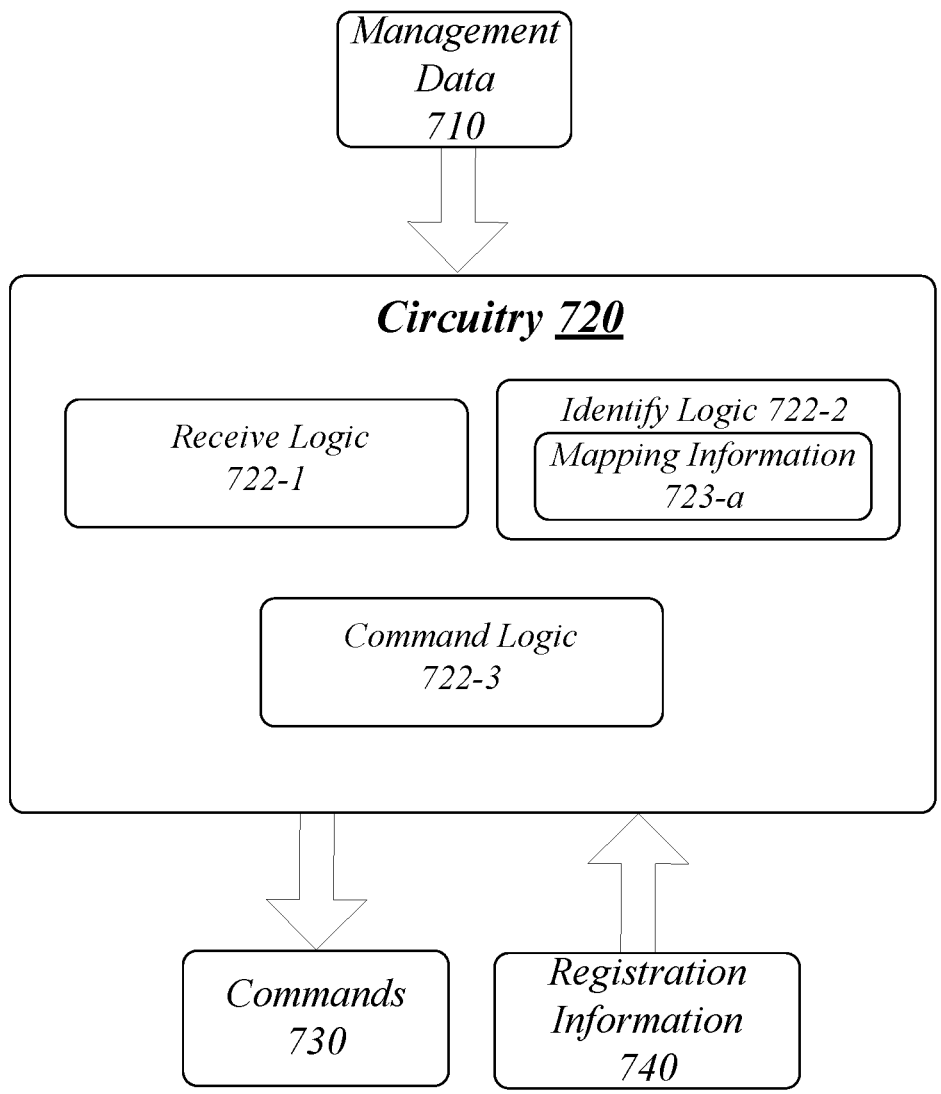
FIG. 7 illustrates an example block diagram for a second apparatus.

FIG. 7 illustrates an example block diagram for apparatus 700. Although apparatus 700 shown in FIG. 7 has a limited number of elements in a certain topology, it may be appreciated that the apparatus 700 may include more or less elements in alternate topologies as desired for a given implementation.

According to some examples, apparatus 700 may be included or embodied as OOB training model management logic 108 or 208 as shown in FIG. 1 or 2 and may be supported by circuitry 720 maintained at OOB trained model management logic 109 or 209. Circuitry 720 may include a processor circuit arranged to execute one or more software or firmware implemented modules, components or logic 722-a (module, component or logic may be used interchangeably in this context). In other examples, circuitry 720 may be arranged to implement modules, components or logic 722-a that may be wholly or at least partially implemented in hardware (module, component or logic may also be used interchangeably in this context). It is worthy to note that "a" and "b" and "c" and similar designators as used herein are intended to be variables representing any positive integer. Thus, for example, if an implementation sets a value for a=3, then a complete set of modules, components or logic 722-a may include logic 722-1, 722-2 or 722-3. The examples presented are not limited in this context and the different variables used throughout may represent the same or different integer values. Also, "logic", "module" or "component" may also include software/firmware stored in computer-readable media, and although types of logic are shown in FIG. 7 as discrete boxes, this does not limit these types of logic to storage in distinct computer-readable media (e.g., a separate memory, etc.).

According to some examples, as mentioned above, circuitry 720 may include a processor circuit. Circuitry 720 may be generally arranged to execute or implement one or more components, modules or logic 722-a. In some examples circuitry 720 may be configured as an application specific integrated circuit (ASIC) and at least some components, modules or logic 722-a may be implemented as hardware elements of the ASIC. According to some examples, circuitry 720 may be configured as a field programmable gate array (FPGA) and at least some components, modules or logic 722-a may be implemented as hardware elements of the FPGA.

In some examples, apparatus 700 may include a receive logic 722-1. Receive logic 722-1 may be executed or implemented by circuitry 720 to receive, via a link, management data to configure a trained model to be implemented by an inference module for a deep learning application. For these examples, the management data may be included in management data 710.

According to some examples, apparatus 700 may also include an identify logic 722-2. Identify logic 722-2 may be executed or implemented by circuitry 720 to identify the inference module to implement the trained model. For these examples, identify logic 722-2 may maintain mapping information 723-a (e.g., in a lookup table) that may indicate which trained models are being implemented by which inference module from among a plurality of inference modules. Identify logic 722-2 may use mapping information 723-a to identify the inference module.

In some examples, registration information 740 may include information to be used by identify logic 722-2 to update mapping information 723-a. The information included in information 740 may be sent from inference modules and may indicate what new trained models have been received and registered by these inference modules.

In some examples, apparatus 700 may also include a command logic 722-3. Command logic 722-3 may be executed or implemented by circuitry 720 to cause the inference module to be configured responsive to the management data based on one or more commands routed to the inference module via an OOB link. For these examples, the trained model may be implemented by the inference module using input data received via an inband link. The one or more commands may be included in commands 730.

Similar to what was mentioned previously, various components, modules or logic of apparatus 700 may be communicatively coupled to each other by various types of communications media to coordinate operations.

FIG. 8 illustrates an example logic flow 800. Logic flow 800 may be representative of some or all of the operations executed by one or more logic or features described herein, such as logic included in apparatus 700. More particularly, logic flow 800 may be implemented by at least receive logic 722-1, identify logic 722-2 or command logic 722-3.

According to some examples, logic flow 800 at block 802 may receive management data to configure a trained model to be implemented by an inference module for a deep learning application. For these examples, receive logic 722-1 may receive the management data.

In some examples, logic flow 800 at block 804 may identify the inference module to implement the trained model. For these examples, identify logic 722-2 may identify the inference module.

According to some examples, logic flow 800 at block 806 may cause the trained model to be configured responsive to the management data based on one or more commands routed to the inference module via an OOB link, the trained model implemented by the inference module using input data received via an inband link. For these examples, command logic 722-3 cause the inference module to be configured responsive to the management data based on the one or more commands.

FIG. 9 illustrates an example storage medium 900. As shown in FIG. 9, the first storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writable or re-writable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
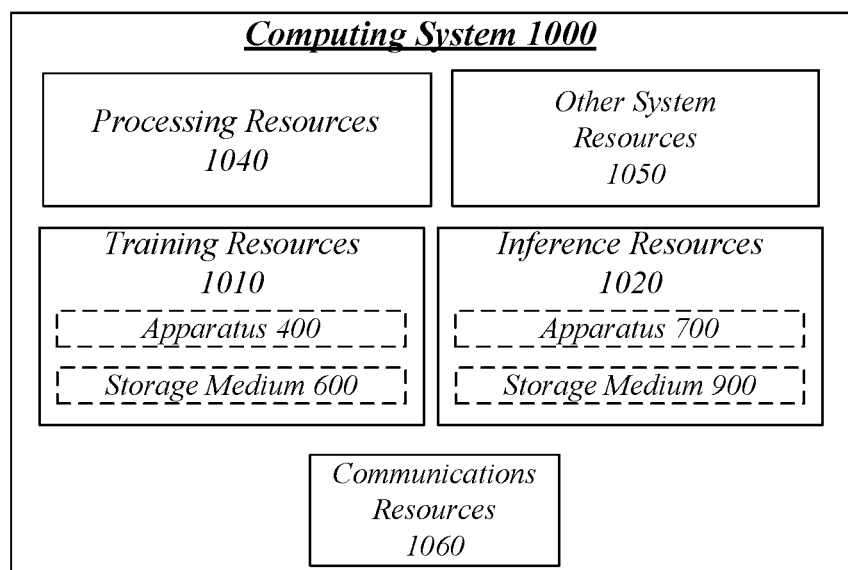
FIG. 10 illustrates an example third system.

FIG. 10 illustrates an example computing system 1000. In some examples, as shown in FIG. 10, computing system 1000 may include training resources 1010, inference resources 1020, processing resources 1040, other system resources 1050 or a communications resources 1060.

In some examples, training resources 1010 may include circuitry to execute or implement logic for apparatus 400 and/or instructions included in storage medium 600. Training resources 1010 may be housed within computing system 1000 and may be arranged to operate in a similar manner to drawer 120 shown in FIG. 1 or drawer 220 shown in FIG. 2. Although not shown in FIG. 10, training resources 1010 may be coupled with inference resources 1020 via a switch similar to AI training to interference switch 105/205 shown in FIGS. 1/2. Training resources 1010 may include various hardware elements, software elements, or a combination of both. Examples of hardware elements may include logic devices, components, processor circuits, circuit elements (e.g., transistors, resistors, capacitors, inductors, and so forth), integrated circuits, programmable logic devices (PLDs), digital signal processors (DSPs), memory units, logic gates, registers and so forth. Examples of software elements may include instruction sets, computing code, computer code, code segments, computer code segments, words, values, symbols, or any combination thereof.

According to some examples, inference resources 1020 may include circuitry to execute or implement logic for apparatus 700 and/or instructions included in storage medium 900. Inference resources 1020 may also be housed within computing system 1000 and may be arranged to operate in a similar manner to drawer 120 shown in FIG. 1 or drawer 230 shown in FIG. 2. Inference resources 1020 may include various hardware elements, software elements, or a combination of both. Examples of hardware and software elements may be similar to but are not limited to the hardware and software elements mentioned above for training resources 1010.

According to some examples, processing resource 1040 may execute processing operations or logic for elements of computing system 1000 such as an operating system and one or more applications (not shown). Processing resources 1040 may include various hardware elements, software elements, or a combination of both. Examples of hardware elements may include devices, logic devices, components, processors, microprocessors, circuits, processor circuits, circuit elements, integrated circuits, ASIC, PLDs, DSPs, FPGA, memory units, storage units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, for training resources 1010, inference resources 1020 or processing resources 1040, determining whether an example is implemented using hardware elements and/or software elements may vary in accordance with any number of factors. The any number of factors may include, but are not limited to, desired computational rate, power levels, heat tolerances, processing cycle budget, input data rates, output data rates, memory resources, data bus speeds and other design or performance constraints, as desired for a given example.

In some examples, other system resources 1050 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), RAM, DRAM, DDR SRAM), SRAM, programmable ROM (PROM), erasable programmable ROM (EPROM), electrically erasable programmable ROM (EEPROM), flash memory, multi-threshold level NAND flash memory, polymer memory such as ferroelectric polymer memory, ovonic memory, phase change or ferroelectric memory, 3-D cross-point memory, FeTRAM, MRAM, STT-MRAM, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications resources 1060 may include logic and/or features to support one or more communication interfaces coupled with links (e.g., to receive management data, training data or input data). For these examples, communications resources 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by the Institute of Electrical and Electronics Engineers (IEEE). For example, one such Ethernet standard promulgated by IEEE may include IEEE 802.3-2012, Carrier sense Multiple access with Collision Detection (CSMA/CD) Access Method and Physical Layer Specifications, Published in December 2012 (hereinafter "IEEE 802.3 specification"). Network communication may also occur according to one or more OpenFlow specifications such as the OpenFlow Hardware Abstraction API Specification. Network communications may also occur according to Infiniband Architecture specification.

The components and features of computing system 1000 may be implemented using any combination of discrete circuitry, ASICs, logic gates and/or single chip architectures. Further, the features of computing system 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing system 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writable or re-writable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1. An example system may include a plurality of training modules to separately implement at least one training model for one or more respective deep learning applications The system may also include training management logic coupled with the plurality of training modules via respective OOBlinks. The training management logic may receive management data and configure the separately implemented at least one training model through the respective OOB links responsive to received management data. The system may also include an inband training data interface and switch coupled with the plurality of training modules via respective inband links to receive training data destined for a training model to be implemented by a training module from among the plurality of training modules and cause received training data to be routed to the training module via an inband link from among the respective inband links.

Example 2. The system of example 1, the plurality of training modules may include a plurality of neural network processors.

Example 3. The system of example 1 may also include the training module to generate a trained mode based on the training module using the received training data to implement the training model. The training module may then send the trained model to an inference module through a switch coupled with the training module and the inference module The inference module may implement the trained model using input data to generate one or more results for the deep learning application.

Example 4. The system of example 3, the inference module may be an FPGA and prior to the trained model being sent to the FPGA, the trained model may be translated to bit-ware to enable the FPGA to be programmed to implement the trained model.

Example 5. The system of example 3, the plurality of training modules and the inference module may be resident on a same platform included in a drawer configured to be inserted in a rack.

Example 6. The system of example 5, the switch may be resident on the same platform.

Example 7. The system of example 3, the plurality of training modules may be resident on a first platform included in a first drawer configured to be inserted in a rack and the inference module may be resident on a second platform included in a second drawer configured to be inserted in the rack.

Example 8. The system of example 7, the may be switch resident on a third platform included in a third drawer configured to be inserted in the rack.

Example 9. The system of example 1, the one or more respective deep learning applications may include facial or voice recognition for an individual or a group of people.

Example 10. An example apparatus may include an interface coupled with a link and circuity to execute or implement logic. The logic may receive, via the link, management data to configure a training model to be implemented by a training module for a deep learning application. The logic may also identify the training module to implement the training model and cause the training module to be configured responsive to the management data based on one or more commands routed to the training module via an OOB link. The training module may receive training data for the training model via an inband link and generate a trained model based on using the training data to implement the training model.

Example 11. The apparatus of example 10, the one or more commands may include at least one of start implementation of the training model, stop implementation of the training model, or change one or more priorities associated with implementing the training model.

Example 12. The apparatus of example 10, the trained model may be implemented by an inference module coupled with the training module through a switch.

Example 13. The apparatus of example 12, the training module may be a neural network processor and the inference module may be an FPGA.

Example 14. The apparatus of example 10, the deep learning application may be facial or voice recognition for an individual or a group of people.

Example 15. An example method may include receiving management data to configure a training model to be implemented by a training module for a deep learning application. The method may also include identifying the training module to implement the training model. The method may also include configuring, responsive to the management data, the training model for implementation by the training module based on one or more commands routed to the training module via an OOB link. The method may also include receiving training data for the training model and routing the training data to the training module via an inband link. The method may also include generating a trained model based on the training module using the training data to implement the training model. The method may also include sending the trained model to an inference module through a switch coupled with the training module and the inference module, the inference module to implement the trained model using input data to generate one or more results for the deep learning application.

Example 16. The method of example 15, the inference module may include an FPGA. The trained model may be translated to bit-ware prior to sending the trained model to enable the FPGA to be programmed to implement the trained model.

Example 17. The method of example 15, the training module may include a neural network processor.

Example 18. The method of example 15, identifying the training module may include identifying the training module from among a plurality of training modules resident on a same platform included in a drawer configured to be inserted in a rack.

Example 19. The method of example 15, the training module and the inference module may be resident on a same platform included in a drawer configured to be inserted in a rack.

Example 20. The method of example 19, the switch may be coupled with the training module and the inference module is resident on the same platform.

Example 21. The method of example 15, the training module may be resident on a first platform included in a first drawer configured to be inserted in a rack and the inference module resident on a second platform included in a second drawer configured to be inserted in the rack.

Example 22. The method of example 21, the switch may be coupled with the training module and the inference module may be resident on a third platform included in a third drawer configured to be inserted in the rack.

Example 23. The method of example 15, the deep learning application may be facial or voice recognition for an individual or a group of people.

Example 24. An example at least one machine readable medium may include a plurality of instructions that in response to being executed by a system may cause the system to carry out a method according to any one of examples 15 to 23.

Example 25. An example apparatus may include means for performing the methods of any one of examples 15 to 23.

Example 26. An example system may include a plurality of inference modules to separately implement at least one trained model for one or more respective deep learning applications. The system may also include trained management logic coupled with the plurality of inference modules via respective OOB links. The trained management logic may receive management data and configure the separately implemented at least one trained model through the respective OOB links responsive to received management data. The system may also include an inband input data interface and switch coupled with the plurality of inference modules via respective inband links to receive input data destined for a trained model to be implemented by an inference module from among the plurality of inference modules and route the input data to the inference module via an inband link from among the respective inband links.

Example 27. The system of example 26, the plurality of inference modules may include a plurality of FPGAs.

Example 28. The system of example 27, the trained model to implemented by the inference module may to be implemented by an FPGA from among the plurality of FPGAs, the trained model generated by a training module coupled with the FPGA through a switch, the trained model may be translated by the training module to bit-ware prior to sending the trained model to enable the FPGA to be programmed to implement the trained model.

Example 29. The system of example 28, the training module and the plurality of FPGAs may be resident on a same platform included in a drawer configured to be inserted in a rack.

Example 30. The system of example 29, the switch may be resident on the same platform.

Example 31. The system of example 29, the plurality of FPGAs may be resident on a first platform included in a first drawer configured to be inserted in a rack and the training module may be resident on a second platform included in a second drawer configured to be inserted in the rack.

Example 32. The system of example 31, the switch may be resident on a third platform included in a third drawer configured to be inserted in the rack.

Example 33. The system of example 26, the one or more respective deep learning applications may include facial or voice recognition for an individual or a group of people.

Example 34. An example apparatus may include an interface coupled with a link. The apparatus may also include circuity to execute or implement logic. the logic may receive, via the link, management data to configure a trained model to be implemented by an inference module for a deep learning application. The logic may also identify the inference module to implement the trained model and cause the trained model to be configured responsive to the management data based on one or more commands routed to the inference module via an OOB link. The trained model may be implemented by the inference module using input data received via an inband link.

Example 35. The apparatus of example 34, the one or more commands may include at least one of start implementation of the trained model, stop implementation of the trained model, or change one or more priorities associated with implementing the trained model.

Example 36. The apparatus of example 34, the trained model may be received from a training module coupled with the inference module through a switch.

Example 37. The apparatus of example 34, the training module may be a neural network processor and the inference module is a FPGA.

Example 38. The apparatus of example 34, the deep learning application may be facial or voice recognition for an individual or a group of people.

Example 39. An example method may include receiving management data to configure a trained model to be implemented by an inference module for a deep learning application. The method may also include identifying the inference module to implement the trained model. The method may also include configuring the trained model for implementation by the inference module based on one or more commands routed to the inference module via an OOB link. The method may also include receiving input data for the trained model and routing the input data to the trained model via an inband link. The method may also include implementing the trained model at the inference module using the received input data to generate one or more results for the deep learning application.

Example 40. The method of example 39, identifying the inference module may include identifying the inference module from among a plurality of inference modules resident on a same platform included in a drawer configured to be inserted in a rack.

Example 41. The method of example 39, the inference module may include an FPGA.

Example 42. The method of example 41, the trained model may be generated by a training module coupled with the FPGA through a switch. the trained model may be translated by the training module to bit-ware prior to sending the trained model to enable the FPGA to be programmed to implement the trained model.

Example 43. The method of example 42, the training module and the FPGA may be resident on a same platform included in a drawer configured to be inserted in a rack.

Example 44. The method of example 43, the switch may be resident on the same platform.

Example 45. The method of example 42, the FPGA may be resident on a first platform included in a first drawer configured to be inserted in a rack and the training module resident on a second platform included in a second drawer configured to be inserted in the rack.

Example 46. The method of example 45, the switch may be resident on a third platform included in a third drawer configured to be inserted in the rack.

Example 47. The method of example 41, the deep learning application may be facial or voice recognition for an individual or a group of people.

Example 48. An example at least one machine readable medium may include a plurality of instructions that in response to being executed by a system may cause the system to carry out a method according to any one of examples 39 to 47.

Example 49. An example apparatus may include means for performing the methods of any one of examples 39 to 47.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Computer apparatus usable in association with artificial intelligence-related operations, the computer apparatus comprising:
    a computing platform that houses components of the computer apparatus, the components comprising:
        a plurality of circuit boards comprising circuitry-based resources for use, when the computing platform is in operation, in training-related operations and inference-related operations, the circuitry-based resources comprising graphics processing unit (GPU) circuitry and central processing unit (CPU) circuitry;
        a resource switch chip for use in direct GPU to GPU data communication among the circuitry-based resources via respective switch-related links;
        network communication and switching circuitry for use in receiving training-related data and at least one inference-related request;
    wherein:
        the training-related data is for use in association with configuring at least certain of the circuitry-based resources to implement, via the training-related operations, at least one training model;
        the training-related operations also comprise configuring, based upon training input data, the at least one training model so as to generate at least one trained model;
        the at least one trained model is to be implemented via the inference-related operations;
        the at least one training model is for use in association with at least one deep learning application;
        the inference-related operations are to be implemented based upon the at least one inference-related request to be received via the network communication and switching circuitry;
        different respective sets of data communication links are to be used in data transmissions involving the circuitry-based resources;
        the different respective sets of data communication links comprise at least one set of data communication links and at least one other set of data communication links;
        the at least one set of data communication links supports a first data communication bandwidth that is higher than a second bandwidth that is supported by the at least one other set of data communication links;

the different respective sets of data communication links correspond, at least in part, to respective subsets of the components;

the respective subsets of the components comprise the circuitry-based resources; and the computing platform is configured for insertion in another computing platform.

2. The computer apparatus of claim 1, wherein:
the resource switch chip is optimized for the direct GPU to GPU data communication.

3. The computer apparatus of claim 1, wherein:
the at least one deep learning application comprises:
facial recognition;
voice recognition; or
image recognition.

4. The computer apparatus of claim 3, wherein:
the at least one inference request is to request that the at least one trained model be implemented via the inference-related operations.

5. The computer apparatus of claim 4, wherein:
the training-related operations and/or the inference-related operations are to be implemented in accordance with at least one service agreement.

6. The computer apparatus of claim 4, wherein:
the computing platforms are configured to be coupled via a backplane and/or rack.

7. The computer apparatus of claim 1, wherein:
the GPU circuitry is comprised in processing modules; and
each of the processing modules comprises graphics processing units.

8. The computer apparatus of claim 7, wherein:
the CPU circuitry comprises multiple central processing units;
the computer apparatus includes at least one power supply; and
the computer apparatus comprises PCIe communication resources.

9. The computer apparatus of claim 8, wherein:
the network communication and switching circuitry is configured for Ethernet protocol communication.

10. At least one machine-readable medium storing instructions executable by at least one machine comprised in a computer apparatus, the computer apparatus being usable in association with artificial intelligence-related operations, the instructions, when executed by the at least one machine, resulting in the computer apparatus being configured for performance of operations comprising:

training-related operations and inference-related operations, the training-related operations and inference-related operations to be performed by circuitry-based resources of the computer apparatus, the circuitry-based resources being comprised in circuit boards housed by a computing platform of the computer apparatus, the circuitry-based resources comprising graphics processing unit (GPU) circuitry and central processing unit (CPU) circuitry;

direct GPU to GPU data communication, via a resource switch chip and respective switch-related links housed by the computing platform, among the circuitry-based resources; and receipt, via network communication and switching circuitry housed by the computing platform, of training-related data and at least one inference-related request;

wherein:

the training-related data is for use in association with configuring at least certain of the circuitry-based resources to implement, via the training-related operations, at least one training model;

the training-related operations also comprise configuring, based upon training input data, the at least one training model so as to generate at least one trained model;

the at least one trained model is to be implemented via the inference-related operations;

the at least one training model is for use in association with at least one deep learning application;

the inference-related operations are to be implemented based upon the at least one inference-related request received via the network communication and switching circuitry;

different respective sets of data communication links are to be used in data transmissions involving the circuitry-based resources;

the different respective sets of data communication links comprise at least one set of data communication links and at least one other set of data communication links;

the at least one set of data communication links supports a first data communication bandwidth that is higher than a second bandwidth that is supported by the at least one other set of data communication links;

the different respective sets of data communication links correspond, at least in part, to respective subsets of components of the computer apparatus, the components being housed by the computing platform;

the respective subsets of the components comprise the circuitry-based resources; and the computing platform is configured for insertion in another computing platform.

11. The at least one machine-readable medium of claim 10, wherein:
the resource switch chip is optimized for the direct GPU to GPU data communication.

12. The at least one machine-readable medium of claim 10, wherein:
the at least one deep learning application comprises:
facial recognition;
voice recognition; or
image recognition.

13. The at least one machine-readable medium of claim 12, wherein:
the at least one inference request is to request that the at least one trained model be implemented via the inference-related operations.

14. The at least one machine-readable medium of claim 13, wherein:
the training-related operations and/or the inference-related operations are to be implemented in accordance with at least one service agreement.

15. The at least one machine-readable medium of claim 13, wherein:
the computing platforms are configured to be coupled via a backplane and/or rack.

16. The at least one machine-readable medium of claim 10, wherein:
the GPU circuitry is comprised in processing modules; and each of the processing modules comprises graphics processing units.

17. The at least one machine-readable medium of claim 16, wherein:
the CPU circuitry comprises multiple central processing units;
the computer apparatus includes at least one power supply; and
the computer apparatus comprises PCIe communication resources.

18. The at least one machine-readable medium of claim 17, wherein:
the network communication and switching circuitry is configured for Ethernet protocol communication.

19. A method implemented using a computer apparatus, the computer apparatus being usable in association with artificial intelligence-related operations, the method comprising:
executing training-related operations and inference-related operations, the training-related operations and inference-related operations to be performed by circuitry-based resources of the computer apparatus, the circuitry-based resources being comprised in circuit boards housed by a computing platform of the computer apparatus, the circuitry-based resources comprising graphics processing unit (GPU) circuitry and central processing unit (CPU) circuitry;
carrying out direct GPU to GPU data communication, via a resource switch chip and respective switch-related links housed by the computing platform, among the circuitry-based resources; and
receiving, via network communication and switching circuitry housed by the computing platform, training-related data and at least one inference-related request;
wherein:
the training-related data is for use in association with configuring at least certain of the circuitry-based resources to implement, via the training-related operations, at least one training model;
the training-related operations also comprise configuring, based upon training input data, the at least one training model so as to generate at least one trained model;
the at least one trained model is to be implemented via the inference-related operations;
the at least one training model is for use in association with at least one deep learning application;
the inference-related operations are to be implemented based upon the at least one inference-related request received via the network communication and switching circuitry;
different respective sets of data communication links are to be used in data transmissions involving the circuitry-based resources;
the different respective sets of data communication links comprise at least one set of data communication links and at least one other set of data communication links;
the at least one set of data communication links supports a first data communication bandwidth that is higher than a second bandwidth that is supported by the at least one other set of data communication links;
the different respective sets of data communication links correspond, at least in part, to respective subsets of components of the computer apparatus, the components being housed by the computing platform;
the respective subsets of the components comprise the circuitry-based resources; and
the computing platform is configured for insertion in another computing platform.

20. The method of claim 13, wherein:
the resource switch chip is optimized for the direct GPU to GPU data communication.

21. The method of claim 19, wherein:
the at least one deep learning application comprises:
facial recognition;
voice recognition; or
image recognition.

22. The method of claim 21, wherein:
the at least one inference request is to request that the at least one trained model be implemented via the inference-related operations.

23. The method of claim 22, wherein:
the training-related operations and/or the inference-related operations are to be implemented in accordance with at least one service agreement.

24. The method of claim 22, wherein:
the computing platforms are configured to be coupled via a backplane and/or rack.

25. The method of claim 19, wherein:
the GPU circuitry is comprised in processing modules; and
each of the processing modules comprises graphics processing units.

26. The method of claim 25, wherein:
the CPU circuitry comprises multiple central processing units;
the computer apparatus includes at least one power supply; and
the computer apparatus comprises PCIe communication resources.

27. The method of claim 26, wherein:
the network communication and switching circuitry is configured for Ethernet protocol communication.

28. At least one computer apparatus to be used in carrying out artificial intelligence-related operations, the at least one computer apparatus comprising:
at least one computing platform to be used in housing components of the at least one computer apparatus, the components comprising:
a plurality of circuit boards comprising circuitry-based resources to be used, when the at least one computing platform is in operation, in training-related operations and inference-related operations, the circuitry-based resources comprising central processing unit (CPU) circuitry and deep learning accelerator circuitry;
resource data communication circuitry usable in direct accelerator to accelerator data communication among the circuitry-based resources via respective accelerator-related links; and
communication circuitry usable in receiving network-related data;
wherein:
the deep learning accelerator circuitry comprises neutral network processing accelerator circuitry and field programmable gate array circuitry;
different respective sets of data communication links are for use in data transmissions involving the circuitry-based resources;

the different respective sets of data communication links comprise at least one set of data communication links and at least one other set of data communication links;

the at least one set of data communication links supports at least one data communication bandwidth that is higher than at least one other relatively lower bandwidth that is supported by the at least one other set of data communication links;

the different respective sets of data communication links are to be used in communication between or among respective subsets of the components;

the respective subsets of the components comprise, at least in part, the circuitry-based resources;

the CPU circuitry comprises multiple central processing units; and the at least one computer apparatus includes at least one power supply.

29. The at least one computer apparatus of claim 28, wherein:

the resource data communication circuitry is optimized for the direct accelerator to accelerator data communication.

30. The at least one computer apparatus of claim 28, wherein:

the artificial intelligence-related operations are at least partially related to:
at least one security-related application;
facial recognition;
voice recognition; and/or
image recognition.

31. The at least one computer apparatus of claim 28, wherein:

the training-related operations and/or the inference-related operations are to be implemented in accordance with at least one service agreement; and/or the at least one computing platform is configured to be coupled via a backplane and/or rack.

32. The at least one computer apparatus of claim 28, wherein:

the communication circuitry is configured for Ethernet protocol communication;

trained models are to be implemented via the inference-related operations; and the at least one computer apparatus comprises PCIe communication resources.

33. At least one machine-readable medium storing instructions executable by at least one machine comprised in at least one computer apparatus, the at least one computer apparatus to be used in carrying out artificial intelligence-related operations, the instructions, when executed by the at least one machine, resulting in the at least one computer apparatus being configured for performance of operations comprising:

training-related operations and inference-related operations, the training-related operations and the inference-related operations to be performed using circuitry-based resources of the at least one computer apparatus, the circuitry-based resources being comprised in circuit boards to be housed in at least one computing platform, the circuitry-based resources comprising central processing unit (CPU) circuitry and deep learning accelerator circuitry;

direct accelerator to accelerator data communication, via resource data communication circuitry and respective accelerator-related links, among the circuitry-based resources; and receipt, via communication circuitry, of network-related data;

wherein:

the deep learning accelerator circuitry comprises neutral network processing accelerator circuitry and field programmable gate array circuitry;

different respective sets of data communication links are to be used in data transmissions involving the circuitry-based resources;

the different respective sets of data communication links comprise at least one set of data communication links and at least one other set of data communication links;

the at least one set of data communication links supports at least one data communication bandwidth that is higher than at least one other relatively lower bandwidth that is supported by the at least one other set of data communication links;

the different respective sets of data communication links are to be used in communication between or among respective subsets of components housed in the at least one computing platform;

the respective subsets of the components comprise, at least in part, the circuitry-based resources;

the CPU circuitry comprises multiple central processing units; and the at least one computer apparatus includes at least one power supply.

34. The at least one machine-readable medium of claim 33, wherein:

the resource data communication circuitry is optimized for the direct accelerator to accelerator data communication.

35. The at least one machine-readable medium of claim 33, wherein:

the artificial intelligence-related operations are at least partially related to:
at least one security-related application;
facial recognition;
voice recognition; and/or
image recognition.

36. The at least one machine-readable medium of claim 33, wherein:

the training-related operations and/or the inference-related operations are to be implemented in accordance with at least one service agreement; and/or the at least one computing platform is configured to be coupled via a backplane and/or rack.

37. The at least one machine-readable medium of claim 33, wherein:

the at least one computer apparatus comprises PCIe communication resources;

the communication circuitry is configured for Ethernet protocol communication; and/or trained models are to be implemented via the inference-related operations.

* * * * *